(12) United States Patent
Boyd et al.

(10) Patent No.: US 6,730,910 B1
(45) Date of Patent: May 4, 2004

(54) DETECTING INFRARED RADIATION

(75) Inventors: Robert W. Boyd, Rochester, NY (US); Clovis R. Haden, College Station, TX (US); Marlan O. Scully, Bryan, TX (US); Vitaly Kocharovsky, College Station, TX (US); Alexey Belyanin, College Station, TX (US)

(73) Assignee: The Texas A&M University System, College Station, TX (US)

( * ) Notice: Subject to any disclaimer, the term of this patent is extended or adjusted under 35 U.S.C. 154(b) by 271 days.

(21) Appl. No.: 10/003,655

(22) Filed: Oct. 31, 2001

(51) Int. Cl.$^7$ .................................................. G01J 5/00
(52) U.S. Cl. .................................................. 250/338.1
(58) Field of Search ........................................ 250/338.1

(56) References Cited

U.S. PATENT DOCUMENTS

| | | | | |
|---|---|---|---|---|
| 4,293,769 A | * | 10/1981 | Kleppner | 250/338.1 |
| 5,502,585 A | * | 3/1996 | Qian | 359/108 |
| 5,898,720 A | * | 4/1999 | Yamamoto et al. | 372/39 |
| 6,445,000 B1 | * | 9/2002 | Masalkar et al. | 257/21 |
| 6,541,788 B2 | * | 4/2003 | Petroff et al. | 257/21 |
| 2002/0041610 A1 | * | 4/2002 | Scully et al. | 372/4 |

OTHER PUBLICATIONS

Efficient infrared imaging upconversion via quantum conherence; Robert W. Boyd, Marlan O. Scully; 2000 American Institute of Physics [S0003–6951(00)03448–3]; Applied Physics Letters, vol. 77, No. 22; pp. 3559–3561, Nov. 27, 2000.

Image Conversion From 1.6 µ To The Visible In Lithium Niobate*; J. E. Midwinter; Royal Radar Establishment; Malvern, Worcestershire, U.K.; (Received Dec. 18, 1967); Applied Physics Letters, vol. 12, No. 3; pp. 68–70, Feb. 1, 1968.

An infrared upconverter for astronomical imaging$^{a)}$; R. W. Boyd and C. H. Townes; Applied Physics Letters, vol. 31, No. 7; Copyright 1977 American Institute of Physics; pp. 440–442, Oct. 1, 1977.

Efficient ir image up–conversion in two–photon resonantly pumped CS vapor*; E. A. Stappaerts, S. E. Harris, and J. F. Young; Applied Physics Letters, vol. 29, No. 10; Copyright 1976 American Institute of Physics; pp. 669–670, Nov. 15, 1976.

Observation of resonantly enhanced sum–frequency generation involving sodium Rydberg states; Daniel J. Gauthier, Jerzy Krasinski, and Robert W. Boyd; The Institute of Optics, University of Rochester, Rochester, New York 14627; Optics Letters; Apr. 1983, vol. 8, No. 4; Optical Society of America; pp. 211–213, Apr. 1983.

* cited by examiner

*Primary Examiner*—Constantine Hannaher
(74) *Attorney, Agent, or Firm*—Baker Botts L.L.P.

(57) ABSTRACT

According to one embodiment, detecting radiation includes receiving a first laser drive field at a cell comprising a medium having a number of states. The first laser drive field has a frequency approximately equivalent to a transition frequency between a first state and a second state. A second laser drive field having a frequency approximately equivalent to a transition frequency between the first state and a third state, and an infrared field having a frequency approximately equivalent to a transition frequency between the third state and a fourth state are received. The medium has a transition between the second state and the third state substantially forbidden to support optimal coherence on the transition between the second state and the third state. The infrared field is upconverted to generate a detectable field having a frequency approximately equivalent to a transition frequency between the second state and the fourth state.

36 Claims, 2 Drawing Sheets

DETECTING INFRARED RADIATION

GOVERNMENT CONTRACT

The U.S. Government has a paid-up license in this invention and the right in limited circumstances to require the patent owner to license others on reasonable terms as provided for by the terms of Contract No. N00014-99-1-0001 awarded by the Office of Naval Research and Contract No. PHY-9732445 awarded by the National Science Foundation.

TECHNICAL FIELD OF THE INVENTION

This invention relates generally to the field of detectors and more specifically to infrared detectors.

BACKGROUND OF THE INVENTION

An infrared field may be detected using frequency upconversion whereby the infrared field is converted to a visible field. Frequency upconversion is typically achieved by generating the sum frequency of the infrared field and one or more laser drive fields through the use of second-order or third-order nonlinear optical interactions. Frequency upconversion of an infrared field may provide nearly diffraction-limited performance using a continuous wave laser source, and may have satisfactory conversion efficiency when used with a pulsed wave laser source. Conversion efficiency with a continuous wave laser source, however, may be unsatisfactory for many needs.

SUMMARY OF THE INVENTION

According to one embodiment of the present invention, detecting radiation includes receiving a first laser drive field at a cell comprising a medium having a number of states. The first laser drive field has a frequency approximately equivalent to a transition frequency between a first state and a second state of the number of states. A second laser drive field having a frequency approximately equivalent to a transition frequency between the first state and a third state of the number of states, and an infrared field having a frequency approximately equivalent to a transition frequency between the third state and a fourth state of the number of states are received. The medium has a transition between the second state and the third state substantially forbidden to support optimal coherence on the transition between the second state and the third state. The infrared field is upconverted to generate a detectable field having a frequency approximately equivalent to a transition frequency between the second state and the fourth state.

Certain embodiments of the present invention may have technical advantages. Some embodiments may benefit from some, all, or none of these advantages. A technical advantage of one embodiment may be that infrared detection occurs with high conversion efficiency with a continuous wave laser source. A phase-coherent atomic system, that is, a phaseonium, may be used to render a material system transparent to resonant laser radiation while retaining desirable nonlinear optical properties associated with the resonant response of the material system. Another technical advantage of an embodiment may be that the technique may be applicable for a broad range of wavelengths from, for example, the near-infrared to the submillimeter spectral regions.

Other technical advantages are readily apparent to one skilled in the art from the following figures, descriptions, and claims. Embodiments of the invention may include none, some, or all of the technical advantages.

BRIEF DESCRIPTION OF THE DRAWINGS

For a more complete understanding of the present invention and for further features and advantages of example embodiments thereof, reference is now made to the following description, taken in conjunction with the accompanying drawings, in which.

DETAILED DESCRIPTION OF THE DRAWINGS

Figure 1:
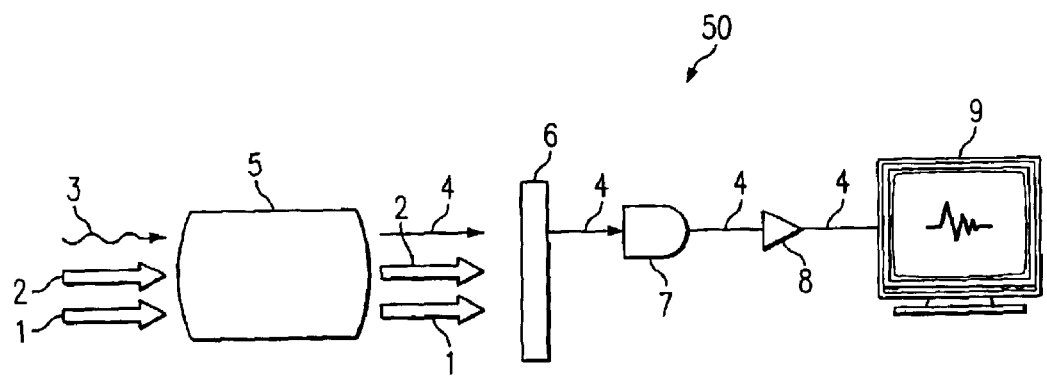
FIG. 1 is a block diagram illustrating one embodiment of a system for frequency upconversion.

FIG. 1 is a block diagram illustrating one embodiment of a system 50 for frequency upconversion. In general, laser drive fields 1 and 2 and an infrared field 3 propogate through a cell 5. Nonlinear wave mixing occurs among laser drive fields 1 and 2, resulting in frequency upconversion of infrared field 3 to a detectable field such as a visible field 4.

Laser drive fields 1 and 2 may operate in a spectral range including, for example, the visible and near-infrared range such as between 400 nm and 1.5 micrometers and the ultraviolet range up to 200 nm. Infrared field 3 may operate in, for example, the mid-infrared to submillimeter range from 2 to 1000 micrometers. Visible field 4 may operate in, for example, the visible to near-infrared range between 400 nm and 2 micrometers, which may be detected by highly sensitive photodetectors.

Cell 5 receives laser drive fields 1 and 2 and infrared field 3. Nonlinear mixing occurs among laser drive fields 1 and 2, resulting in a frequency upconversion of infrared field 3 to visible field 4. Cell 5 may comprise any material suitable for frequency upconversion such as an atomic or molecular vapor or semiconductor crystal. Cell 5 may comprise, for example, a vapor such as sodium vapor held in a casing comprising a substantially transparent material such as glass. Alternatively, cell 5 may comprise a semiconductor crystal held by a holder comprising a conductive material such as copper. Example embodiments of cell 5 are described in more detail with reference to FIGS. 2, 3, and 5.

A filter 6 receives laser drive fields 1 and 2 and visible field 4, and filters out laser drive fields 1 and 2. Filter 6 may comprise a filter suitable for filtering a laser drive fields 1 and 2 such as a semiconductor, dielectric plate, or grating filter. A detector such as a photodetector 7 detects visible field 4 and generates an electric signal in response to visible field 4. Photodetector 7 may comprise, for example, a photodiode for the detection of visible light. An amplifier 8 amplifies the electric signal, and a monitor displays the electric signal, which represents infrared field 3.

Figure 2:
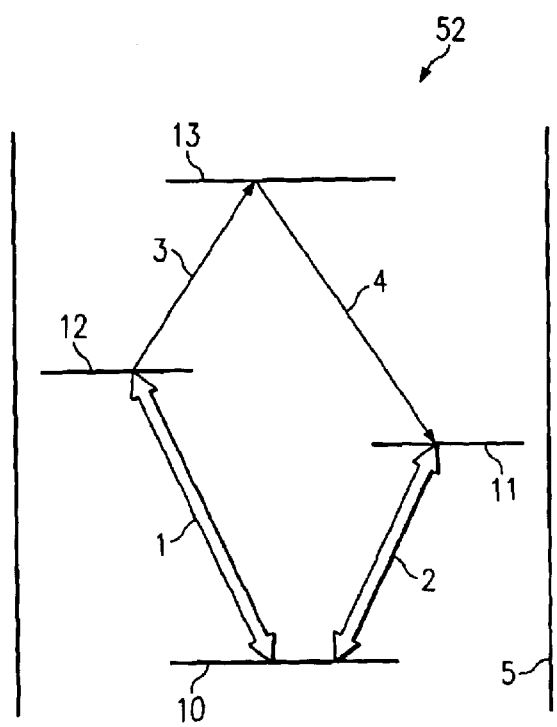
FIG. 2 is an energy diagram illustrating an example of frequency upconversion in a cell comprising an atomic vapor.

FIG. 2 is an energy diagram 52 illustrating one example of frequency upconversion in one embodiment of cell 5 comprising an atomic vapor. Energy diagram 52 illustrates electronic states 10 through 13 of the atomic vapor interacting with laser drive fields 1 and 2, infrared fields 3, and visual field 4. Laser drive fields 1 and 2 are applied to the atomic medium at frequencies approximate to the resonance frequencies of the transition from state 10 to state 12 and the transition from state 10 to state 11, respectively. Infrared field 3 at a frequency approximate to the resonance frequency of the transition from state 12 to state 13 may be converted to visible field 4 at a frequency approximate to the resonance frequency of the transition from state 11 to state 13.

The values of the transition frequencies and of the corresponding frequencies of the laser drive fields 1 and 2, infrared field 3, and visible field 4 may vary, depending on the atomic vapor. In one embodiment, the frequencies may fall into the spectral ranges described with reference to FIG. 1.

Frequency upconversion may occur with high efficiency if: (1) infrared field 3 and visible field 4 undergo negligible absorption; (2) appreciable coupling occurs over the length of cell 5; and (3) phase matching is satisfied.

First, absorption may be negligible if the absorption lengths of infrared field 3 and visible field 4 are shorter than a characteristic coupling length, which is proportional to the amplitude of coherence between states 11 and 12. This may occur if an optimal coherence is supported in a medium such as a phaseonium medium, which may be realized if: (1) the intensities of laser drive fields 1 and 2 are of the order of saturation intensities of their corresponding transitions, which may be between 0.1 and 10 $kW/cm^2$ for the typical optical transitions of atoms; and (2) the laser drive fields 1 and 2 are sufficiently detuned from resonance frequencies of the medium, where the detuning intensities of laser drive fields 1 and 2 is substantially equivalent to at least the total linewidths of the corresponding transitions.

Second, for appreciable coupling to occur over the length of cell 5, the detuning of laser drive fields 1 and 2 may be restricted to be not much greater than the above linewidths. The detuning of laser drive fields 1 and 2 may be approximately equal to the total linewidths of the transition from state 10 to state 11 and the transition from state 10 to state 12, respectively. For atomic vapors, the detuning may be from 0.1 to 10 GHz.

Third, the phase matching condition may be satisfied when the nonlinear susceptibility of the atomic medium at frequencies of infrared field 3 and visible field 4 is approximately equal to the linear susceptibility, which may be achieved under the conditions specified above. Phase matching may be improved by allowing for a small angle, for example, less than 1 degree, between the propagation directions of laser drive fields 1 and 2.

Figure 3:
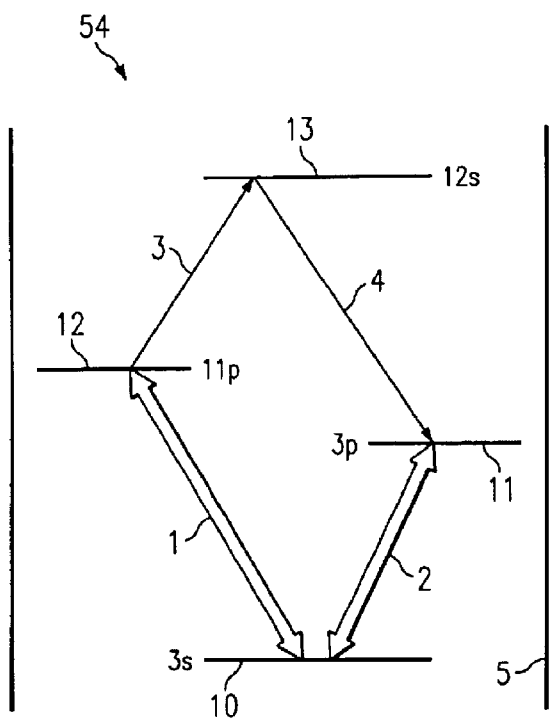
FIG. 3 is an energy diagram illustrating an example of frequency conversion in a cell comprising atomic sodium vapor.

FIG. 3 is an energy diagram 54 illustrating an example of frequency upconversion in one embodiment of cell 5 comprising atomic sodium vapor. Electronic states 10, 11, 12, and 13 correspond to sodium levels $3s$, $3p$, $11p$, and $12s$, respectively. Laser drive fields 1 and 2 may be applied at wavelengths of approximately 248 nm and 589 nm, respectively. Infrared field 3 at a wavelength of approximately 100 micrometers may be converted to visible field 4 of a wavelength of approximately 425 nm.

In one embodiment, cell 5 may comprise a vapor with a sodium number density approximately equal to $10^{16}$ $cm^{-3}$. A substantially transparent casing such as a glass casing with, for example, a length of approximately 0.5 to 10 cm and a diameter of approximately 0.2 to 1 cm may be used to hold the vapor. The detuning of laser drive fields 1 and 2 may be approximately equal to 1 GHz. The intensity of laser drive field 1 may be greater than 500 $W/cm^2$, and the intensity of laser drive field 2 may be greater than 13 $mW/cm^2$. In the embodiment, infrared field 3 may be efficiently converted to visible field 4.

Figure 4:
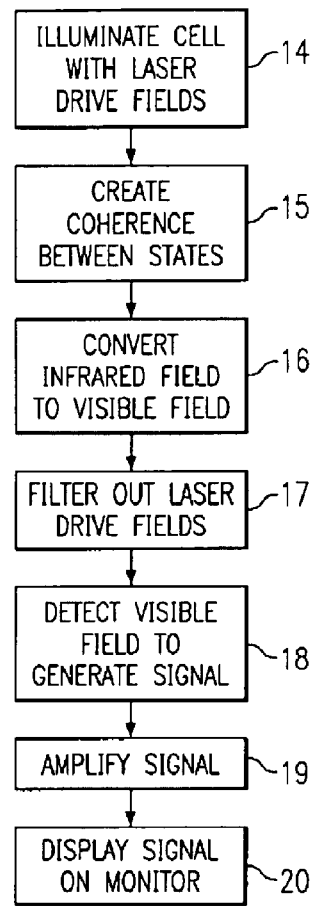
FIG. 4 is a flowchart illustrating one embodiment of a method for frequency upconversion.

FIG. 4 is a flowchart illustrating one embodiment of a method for frequency upconversion. The method starts at step 14, where laser drive fields 1 and 2 illuminate cell 5. Laser drive fields 1 and 2 create a coherence between electronic states 11 and 12 at step 15. At step 16, an infrared field 3 incident on cell 5 is converted to visible field 4.

At step 17, filter 6 receives laser drive fields 1 and 2 and visible field 4 and filters out laser drive fields 1 and 2, allowing visible field 4 to propagate through filter 6. Visible field 4 is detected by photodetector 7 at step 18, which generates a signal. The signal from photodetector 7 is amplified by amplifier 8 at step 19. The signal from amplifier 8 is displayed on monitor 9 at step 20.

Figure 5:
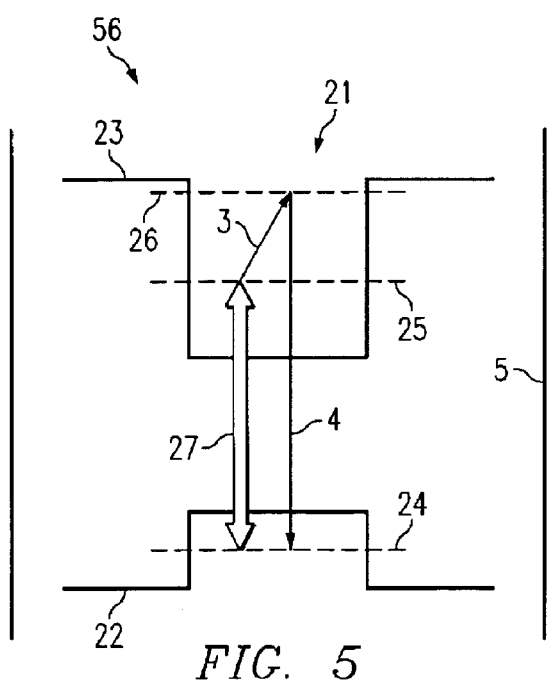
FIG. 5 is a band alignment diagram illustrating one example of frequency upconversion in a cell comprising a semiconductor crystal.

FIG. 5 is a band alignment diagram 56 illustrating one example of frequency upconversion in one embodiment of cell 5 that has a number of levels. Cell 5 may comprise a semiconductor crystal held by a holder comprising a conductive material such as copper and that acts as a heat sink. The semiconductor crystal may be several hundred micrometers in size. Cell 5 may be placed in a cryostat with liquid nitrogen of approximately 770° Kelvin.

Cell 5 may comprise, for example, a number of quantum wells or quantum dots. Band alignment diagram 56 describes a quantum dot 21. Quantum dot 21 may comprise, for example, a three-dimensional island of InAs of a suitable size such as approximately 5 to 20 nm deposited on GaAs. Quantum dot 21 may be grown using standard molecular-beam epitaxy on a GaAs substrate in a Stranski-Krastanov growth mode. The edge of a valence band 22 and the edge of a conduction band 23 may form a three-dimensional potential well for holes and electrons, respectively, and the hole and electron levels may become quantized. Band alignment diagram 56 also shows a hole level 24 and electron levels 25 and 26. In an alternative embodiment, level 24 may be an electron level, and levels 25 and 26 may be hole levels.

The transitions allowed by selection rules may occur if hole level 24 and electron levels 25 and 26 have the same principal quantum number n=1, but hole level 24 and electron levels 25 and 26 may have different orbital quantum numbers. Laser drive field 27 is applied to a system of quantum dots at a photon energy approximate to the transition energy between electron levels 24 and 25, for example, between 1 and 1.3 eV. Strong absorption may be avoided if the photon energy of laser drive field 27 is less than the resonance energy of the transition from hole level 24 to electron level 25 by approximately 10 to 20 meV.

Infrared field 3 at a frequency approximate to the transition frequency between electron levels 25 and 26 may be converted to visible field 4 at a frequency approximate to the transition frequency between hole level 24 and electron level 26. Efficient upconversion may be achieved using a stack of 10 to 20 layers of InAs quantum dots 21 with a sheet density approximately equal to $10^{11}$ $cm^{-2}$.

Certain embodiments of the present invention may have technical advantages, although all embodiments may not necessarily benefit from these advantages. A technical advantage of one embodiment may be that infrared detection occurs with high conversion efficiency with a continuous wave laser source. A phase-coherent atomic system, that is, a phaseonium, may be used to render a material system transparent to resonant laser radiation while retaining desirable nonlinear optical properties associated with the resonant response of the material system. Another technical advantage of an embodiment may be that the technique may be applicable for a broad range of wavelengths from the near-infrared to the submillimeter spectral regions, for example, from 0.7 to 1000 micrometers.

Although embodiments of the invention and their advantages are described in detail, a person skilled in the art could make various alterations, additions, and omissions without departing from the spirit and scope of the present invention as defined by the appended claims.

What is claimed is:

1. A system for detecting radiation, comprising:
    a cell comprising a medium having a plurality of states, the cell operable to:
        receive a first laser drive field having a frequency approximately equivalent to a transition frequency between a first state and a second state of the plurality of states;
        receive a second laser drive field having a frequency approximately equivalent to a transition frequency between the first state and a third state of the plurality of states;
        receive an infrared field having a frequency approximately equivalent to a transition frequency between the third state and a fourth state of the plurality of states, the medium operable to have a transition between the second state and the third state substantially forbidden to support optimal coherence on the transition between the second state and the third state; and
        upconvert the infrared field to generate a detectable field having a frequency approximately equivalent to a transition frequency between the second state and the fourth state of the plurality of states; and
    a detector operable to detect the detectable field.

2. The system of claim 1, wherein the cell is operable to continuously upconvert the infrared field to generate the detectable field.

3. The system of claim 1, wherein:
    an intensity of the first laser drive field is of the order of a saturation intensity of a transition between the first state and the second state; and
    an intensity of the second laser drive field is of the order of a saturation intensity of a transition between the first state and the third state.

4. The system of claim 1, wherein:
    the first laser drive field is approximately detuned from a first resonance frequency of the medium; and
    the second laser drive field is approximately detuned from a second resonance frequency of the medium.

5. The system of claim 1, wherein:
    a detuning of the first laser drive field is approximately equivalent to a linewidth associated with a transition from the first state to the second state; and
    a detuning of the second laser drive field is approximately equivalent to a linewidth associated with a transition from the first state to the third state.

6. The system of claim 1, wherein:
    a nonlinear susceptibility of the medium at the frequency of the infrared field is approximately equal to a linear susceptibility of the medium at the frequency of the infrared field; and
    a nonlinear susceptibility of the medium at the frequency of the detectable field is approximately equal to a linear susceptibility of the medium at the frequency of the detectable field.

7. The system of claim 1, wherein an angle between a first propagation direction of the first laser drive field and a second propagation direction of the second laser drive field is less than two degrees.

8. The system of claim 1, wherein the cell comprises a molecular vapor.

9. The system of claim 1, wherein the cell comprises an atomic vapor.

10. A system for detecting radiation, comprising:
    a cell comprising a semiconductive medium having a plurality of levels, the cell operable to:
        receive a laser drive field having a frequency approximately equivalent to a transition frequency between a first level and a second level of the plurality of levels;
        receive an infrared field having a frequency approximately equivalent to a transition frequency between the second level and a third level of the plurality of levels, the medium operable to have a transition between the first level and the second level partially forbidden to support an optimal coherence on the transition between the first level and the second level; and
        upconvert the infrared field to generate a detectable field having a frequency approximately equivalent to a transition frequency between the first level and the third level; and
    a detector operable to detect the detectable field.

11. The system of claim 10, wherein the cell is operable to continuously upconvert the infrared field to generate the detectable field.

12. The system of claim 10, wherein a photon energy of the laser drive field is less than a transition energy between the first level and the second level by approximately 10 to 20 meV.

13. The system of claim 10, wherein:
    the first level comprises a hole level;
    the second level comprises a first electron level; and
    the third level comprises a second electron level.

14. The system of claim 10, wherein:
    the first level comprises an electron level;
    the second level comprises a first hole level; and
    the third level comprises a second hole level.

15. The system of claim 10, wherein the cell comprises a plurality of quantum dots.

16. The system of claim 10, wherein the cell comprises a stack of approximately ten to twenty layers of quantum dots.

17. The system of claim 10, wherein the cell comprises a plurality of quantum wells.

18. A method for detecting radiation, comprising:
    receiving a first laser drive field at a cell comprising a medium having a plurality of states, the first laser drive field having a frequency approximately equivalent to a transition frequency between a first state and a second state of the plurality of states;
    receiving a second laser drive field having a frequency approximately equivalent to a transition frequency between the first state and a third state of the plurality of states;
    receiving an infrared field having a frequency approximately equivalent to a transition frequency between the third state and a fourth state of the plurality of states, the medium having a transition between the second state and the third state substantially forbidden to support optimal coherence on the transition between the second state and the third state;

generating, by upconverting the infrared field, a detectable field having a frequency approximately equivalent to a transition frequency between the second state and the fourth state; and detecting the detectable field.

19. The method of claim 18, further comprising generating the detectable field by continuously upconverting the infrared field.

20. The method of claim 18, wherein:

an intensity of the first laser drive field is of the order of a saturation intensity of a transition between the first state and the second state; and an intensity of the second laser drive field is of the order of the saturation intensity of a transition between the first state and the third state.

21. The method of claim 18, further comprising:

approximately detuning the first laser drive field from a first resonance frequency of the medium; and approximately detuning the second laser drive field from a second resonance frequency of the medium.

22. The method of claim 18, further comprising:

detuning of the first laser drive field, the detuning being approximately equivalent to a linewidth associated with a transition from the first state to the second state; and detuning of the second laser drive field, the detuning being approximately equivalent to a linewidth associated with a transition from the first state to the third state.

23. The method of claim 18, wherein:

a nonlinear susceptibility of the medium at the frequency of the infrared field is approximately equal to a linear susceptibility of the medium at the frequency of the infrared field; and a nonlinear susceptibility of the medium at the frequency of the detectable field is approximately equal to a linear susceptibility of the medium at the frequency of the detectable field.

24. The method of claim 18, wherein an angle between a first propagation direction of the first laser drive field and a second propagation direction of the second laser drive field is less than two degrees.

25. The method of claim 18, wherein the cell comprises a molecular vapor.

26. The method of claim 18, wherein the cell comprises an atomic vapor.

27. A method for detecting radiation, comprising:

receiving a laser drive field at a cell comprising a semiconductive medium having a plurality of levels, the laser drive field having a frequency approximately equivalent to a transition frequency between a first level and a second level of the plurality of levels;

receiving an infrared field having a frequency approximately equivalent to a transition frequency between the second level and a third level of the plurality of levels, the medium operable to have a transition between the first level and the second level partially forbidden to support an optimal coherence on the transition between the first level and the second level; and upconverting the infrared field to generate a detectable field having a frequency approximately equivalent to a transition frequency between the first level and the third level; and detecting the detectable field.

28. The method of claim 27, further comprising continuously upconverting the infrared field to generate the detectable field.

29. The method of claim 27, wherein a photon energy of the laser drive field is less than a transition energy between the first level and the second level by approximately 10 to 20 meV.

30. The method of claim 27, wherein:

the first level comprises a hole level;

the second level comprises a first electron level; and the third level comprises a second electron level.

31. The method of claim 27, wherein:

the first level comprises an electron level;

the second level comprises a first hole level; and the third level comprises a second hole level.

32. The method of claim 27, wherein the cell comprises a plurality of quantum dots.

33. The method of claim 27, wherein the cell comprises a stack of approximately ten to twenty layers of quantum dots.

34. The method of claim 27, wherein the cell comprises a plurality of quantum wells.

35. A system for detecting radiation, comprising:

means for receiving a first laser drive field, a second laser drive field, and an infrared field and for generating a detectable field by upconverting the infrared field, the receiving and generating means having a plurality of states;

means for detecting the detectable field; and wherein:

the first laser drive has a frequency approximately equivalent to a transition frequency between a first state and a second state of the plurality of states;

the second laser drive has a frequency approximately equivalent to a transition frequency between the first state and a third state of the plurality of states;

the infrared field has a frequency approximately equivalent to a transition frequency between the third state and a fourth state of the plurality of states;

the generated detectable field has a frequency approximately equivalent to a transition frequency between the second state and the fourth state; and the medium has a transition between the second state and the third state substantially forbidden to support optimal coherence on the transition between the second state and the third state.

36. A system for detecting radiation, comprising:

a cell comprising a medium having a plurality of states, the cell operable to:

receive a first laser drive field having a frequency approximately equivalent to a transition frequency between a first state and a second state of the plurality of states, the first laser drive field having an intensity of the order of a saturation intensity of a transition between the first state and the second state, a detuning of the first laser drive field is approximately equivalent to a linewidth associated with the transition from the first state to the second state;

receive a second laser drive field having a frequency approximately equivalent to a transition frequency between the first state and a third state of the plurality of states, the second laser drive field having an intensity of the order of the saturation intensity of a transition between the first state and the third state, a detuning of the second laser drive field is approximately equivalent to a linewidth associated with the transition from the first state to the third state;

receive an infrared field having a frequency approximately equivalent to a transition frequency between the third state and a fourth state of the plurality of states, the medium operable to have a transition between the second state and the third state substantially forbidden to support optimal coherence on the transition between the second state and the third state, an angle between a first propagation direction of the first laser drive field and a second propagation direction of the second laser drive field being less than, two degrees; and continuously upconvert the infrared field to generate a detectable field having a frequency approximately equivalent to a transition frequency between the second state and the fourth state; and a detector operable to detect the detectable field.

* * * * *